(12) United States Patent
Senba

(10) Patent No.: US 8,054,719 B2
(45) Date of Patent: Nov. 8, 2011

(54) COMPARATOR AND OPTICAL-DISC RECORDING/REPRODUCTION APPARATUS

(75) Inventor: Kimimasa Senba, Kanagawa (JP)

(73) Assignee: Sony Corporation, Tokyo (JP)

( * ) Notice: Subject to any disclaimer, the term of this patent is extended or adjusted under 35 U.S.C. 154(b) by 45 days.

(21) Appl. No.: 12/591,287

(22) Filed: Nov. 16, 2009

(65) Prior Publication Data

US 2010/0157758 A1 Jun. 24, 2010

(30) Foreign Application Priority Data

Dec. 19, 2008 (JP) ................................ 2008-323370

(51) Int. Cl.
*G11B 15/52* (2006.01)

(52) U.S. Cl. ............... 369/47.25; 369/44.24; 369/44.25; 369/44.29; 369/44.35; 369/53.35; 369/124.1; 369/124.11

(58) Field of Classification Search ............... 369/47.25, 369/44.35, 44.29, 47.24, 124.11, 124.1, 53.35
See application file for complete search history.

(56) References Cited

U.S. PATENT DOCUMENTS

| | | | | |
|---|---|---|---|---|
| 6,661,759 B1 * | 12/2003 | Seo | ............................ | 369/59.11 |
| 7,215,632 B2 | 5/2007 | Horibe | | |
| 2004/0196926 A1 * | 10/2004 | Chien et al. | .................. | 375/316 |
| 2005/0201253 A1 * | 9/2005 | Yang et al. | ................. | 369/124.1 |
| 2008/0291113 A1 * | 11/2008 | Ou-Yang | ....................... | 343/876 |
| 2009/0092207 A1 * | 4/2009 | Takahashi | ..................... | 375/345 |

FOREIGN PATENT DOCUMENTS

| | | |
|---|---|---|
| JP | 05-067332 A | 3/1993 |
| JP | 05-258464 A | 10/1993 |
| JP | 07-334918 A | 12/1995 |
| JP | 3458502 | 8/2003 |
| WO | WO-03/077248 A1 | 9/2003 |

OTHER PUBLICATIONS

Japanese Office Action issued Nov. 16, 2010 for corresponding Japanese Application. No. 2008-323370.

* cited by examiner

*Primary Examiner* — Wayne Young
*Assistant Examiner* — Linh Nguyen
(74) *Attorney, Agent, or Firm* — Rader, Fishman & Grauer PLLC

(57) ABSTRACT

A comparator includes a variable-gain amplifier circuit configured to vary an amplitude of an input signal by changing a gain in accordance with a control signal, and a comparison section configured to compare a slice level interlocked with a signal level received from the variable-gain amplifier circuit with an output signal received from the variable-gain amplifier circuit and generate an output signal in accordance with a comparison result.

13 Claims, 5 Drawing Sheets

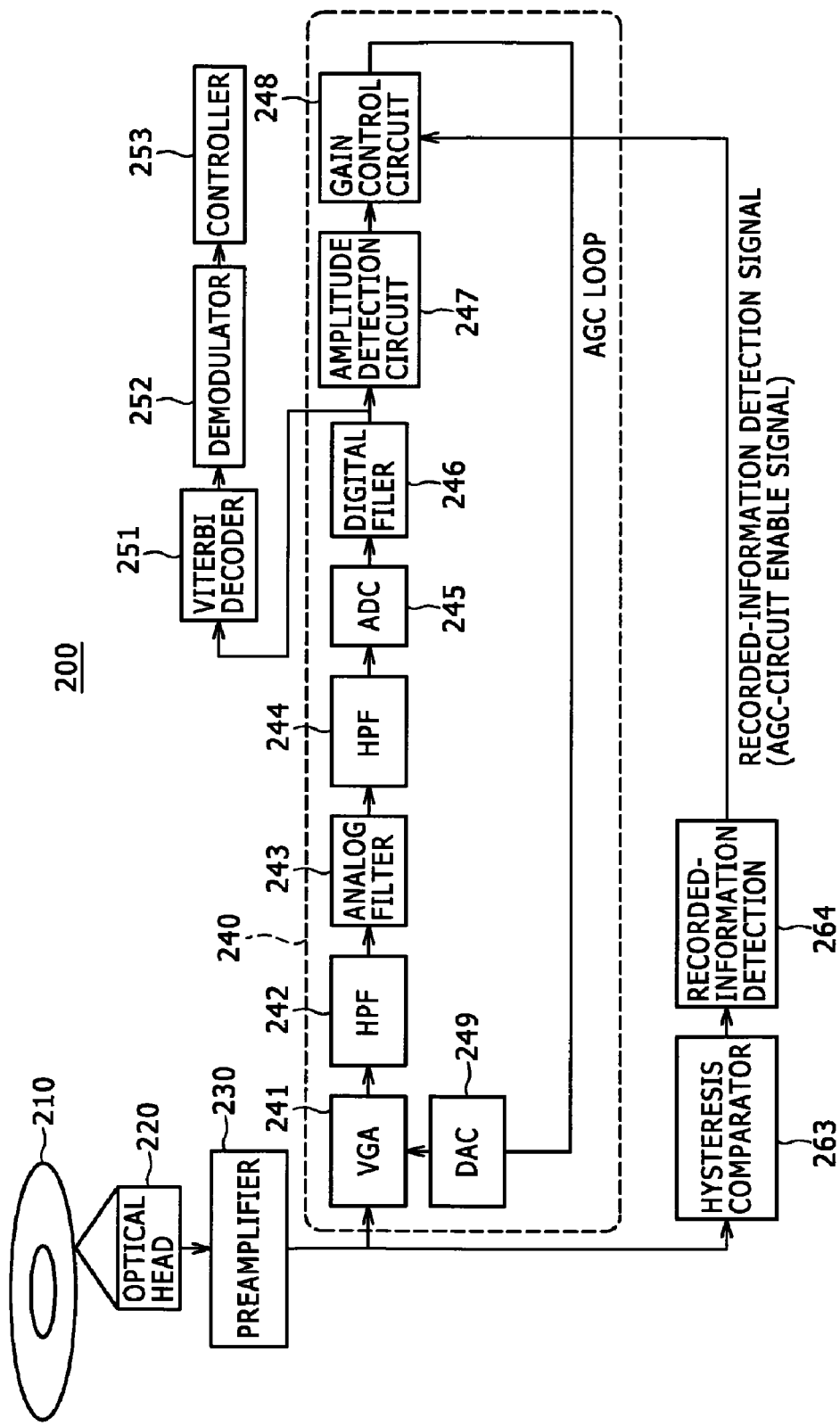

COMPARATOR AND OPTICAL-DISC RECORDING/REPRODUCTION APPARATUS

BACKGROUND OF THE INVENTION

1. Field of the Invention

The present invention relates to a comparator and an optical-disc recording/reproduction apparatus. More particularly, the present invention relates to a recorded-information detection circuit employed in a RF (radio-frequency) signal processing system of an optical-disc recording/reproduction apparatus to serve as a detection circuit for determining whether or not a signal is being supplied to a VGA (variable-gain amplifier).

2. Description of the Related Art

The existing optical-disc recording/reproduction apparatus employs a recorded-information detection circuit for distinguishing recorded and unrecorded areas in an optical disc from each other and for detecting a signal defective portion inadvertently created in the optical disc due to, among others, dusts and/or flaws.

A typical configuration of the recorded-information detection circuit is disclosed in Japanese Patent Laid-open No. Hei 7-334918 whereas an optical-disc recording/reproduction apparatus employing this recorded-information detection circuit is disclosed in documents such as Japanese Patent No. 3458502.

FIG. 6 is a block diagram showing an RF-signal processing system employed in the existing optical-disc recording/reproduction apparatus to serve as a circuit which includes an AGC (automatic gain control) loop. A recorded-information detection signal is used in the AGC loop to serve as a signal for controlling the RF-signal processing. To put it in detail, the recorded-information detection signal is typically used for carrying out hold/reset control of the AGC loop and hold/reset control of a PLL (phase lock loop) circuit for data clock recoveries.

For the reason described above, the recorded-information detection signal is fetched from the front stage of the AGC loop and a detection circuit is provided separately from a main signal processing system following the AGC loop to serve as a circuit for carrying out recorded-information detection processing.

In the mean time, a series of efforts made to miniature semiconductor processes in recent years by applying smaller-size design rules has been serving as a power to drive the replacement of the existing analog-signal processing with digital-signal processing which is expected to serve as processing to be also applied to the recorded-information detection circuit as well.

SUMMARY OF THE INVENTION

The mainstream of the contemporary high-speed ADC (analog/digital converter) for converting an RF signal into a digital one is a converter with a bit count in the range 5 to 6. Thus, in order to assure a high signal-noise ratio of the signal, it is necessary to optimize the amplitude of the signal by making use of an AGC circuit which is provided at the front stage.

As a result, if the recorded-information detection circuit is to be implemented as a digital circuit, the recorded-information detection process is naturally a detection process from the rear of the AGC circuit but a control signal for turning on and off the AGC loop is a detected signal after the AGC process, giving rise to a contradiction.

Addressing the problem described above, an effort has made to implement the recorded-information detection circuit as a digital circuit, in which a detection circuit for determining whether or not a signal is being supplied to a VGA is provided at a rear stage following the VGA as a circuit capable of carrying out a detection process equivalent to that carried out by a detection circuit which makes use of an input signal supplied to the VGA.

A comparator according to a first form of the present invention includes: a variable-gain amplifier circuit configured to vary an amplitude of an input signal by changing a gain in accordance with a control signal; and a comparison section configured to compare a slice level interlocked with a signal level received from the variable-gain amplifier circuit with an output signal received from the variable-gain amplifier circuit and generate an output signal in accordance with a comparison result.

According to a second form of the present invention, an optical-disc recording/reproduction apparatus for reading out information from an optical disc or writing information onto the optical disc, includes: a variable-gain amplifier circuit configured to vary an amplitude of an input signal supplied from an optical pickup by changing a gain in accordance with a control signal; and a comparison section configured to compare a slice level interlocked with a signal level received from the variable-gain amplifier circuit with an output signal received from the variable-gain amplifier circuit and generate an output signal in accordance with a comparison result.

According to a third form of the present invention, an optical-disc recording/reproduction apparatus for reading out information from an optical disc or writing information onto the optical disc, includes: a variable-gain amplifier circuit configured to vary an amplitude of an input signal supplied from an optical pickup by changing a gain in accordance with a control signal; and an analog/digital converter configured to convert an output signal generated by the variable-gain amplifier circuit into a digital signal. The optical-disc recording/reproduction apparatus further includes: an amplitude detection circuit configured to detect the amplitude of the digital signal; a gain control circuit configured to generate the control signal, which is used for controlling a variable gain of the variable-gain amplifier circuit, in accordance with the amplitude obtained as a detection result output by the amplitude detection circuit; and a threshold generation circuit configured to generate a threshold on the basis of the detection result output by the amplitude detection circuit. The optical-disc recording/reproduction apparatus further includes: a comparison section configured to compare the digital signal generated by the analog/digital converter with the threshold; and a recorded-information detection circuit configured to generate the control signal for executing on/off control on the operation of the gain control circuit in accordance with a comparison result generated by the comparison section.

In accordance with an embodiment of the present invention, the RF signal output from a rear stage following the VGA is digitalized. Then, the amplitude of the digitalized signal is detected and a new threshold is found from the detected amplitude and a slice threshold. Subsequently, in order to generate a control signal for the recorded-information detection processing, the new threshold is compared with the digitalized RF signal. The control signal is used for executing on/off control on the operation of the gain control circuit for controlling the gain of the VGA.

By virtue of the present invention, a digital method can be adopted to carry out processing equivalent to the recorded-information detection processing based on the existing analog method. Thus, the size and power consumption of the recorded-information detection circuit can be reduced. In addition, manufacturing processes can be changed with ease to accompany the miniaturization of future semiconductor devices.

BRIEF DESCRIPTION OF THE DRAWINGS

FIG. 6 is a block diagram showing an RF-signal processing system employed in the existing optical-disc recording/reproduction apparatus.

DETAILED DESCRIPTION OF THE PREFERRED EMBODIMENT

A preferred embodiment of the present invention is explained in chapters which are arranged as follows:

1. Configuration of an Optical-Disc Recording/Reproduction Apparatus
2. Configuration of an RF-Signal Processing System
3. Operations of an RF-Signal Processing Circuit <1. Configuration of an Optical-Disc Recording/Reproduction Apparatus>
[Entire Configuration]

Figure 1:
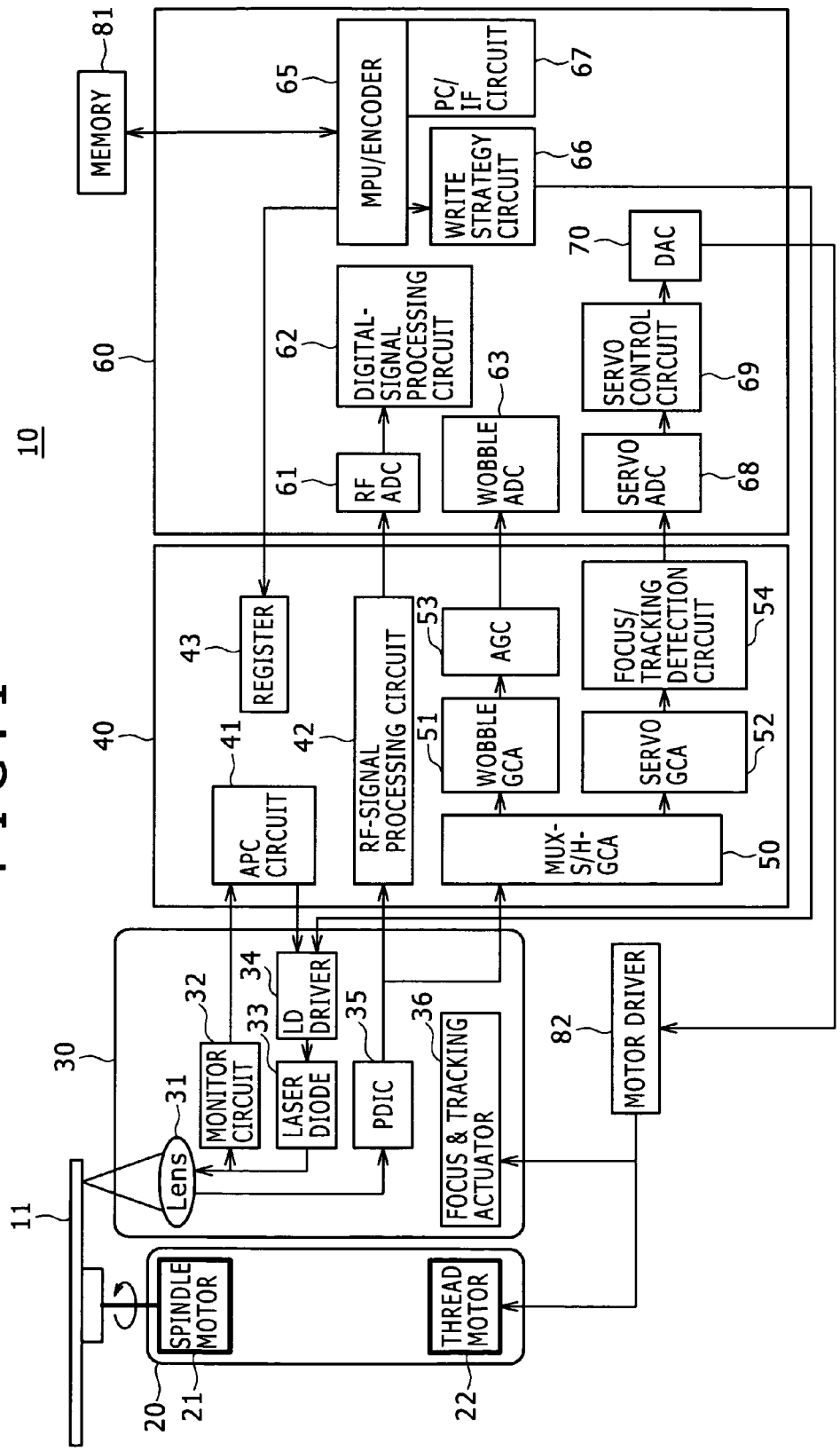
FIG. 1 is a block diagram showing the configuration of an optical-disc recording/reproduction apparatus.

FIG. 1 is a block diagram showing the configuration of an optical-disc recording/reproduction apparatus 10. As shown in the figure, the optical-disc recording/reproduction apparatus 10 employs components including a motor-driving control section 20 for controlling the rotation of an optical disc 11, an optical-pickup unit 30, an AFE (analog front end) 40, a DFE (digital front end) 60 and a memory 81.

The motor-driving control section 20 has a spindle motor 21 for controlling the rotation of the optical disc 11 and a thread motor 22 for controlling the position of the optical-pickup unit 30.

The optical-pickup unit 30 is configured to include a lens 31, a monitor circuit 32, a laser diode 33, an LD (laser diode) driver 34, a PDIC (photo detector integrated circuit) 35 and a focus and tracking actuator 36.

The output terminal of the optical-pickup unit 30 is connected by a flexible cable or the like to the input terminal of the AFE 40.

The PDIC 35 is a component for obtaining an electrical signal from a laser light beam reflected by the optical disc 11. The PDIC 35 is typically a photo detector employing a photo diode of a 4-division type and an operational amplifier. The photo diode of the 4-division type outputs four signals A, B, C and D respectively to the amplifier which then carries out addition and subtraction operations in order to generate a sum signal (A+B+C+D) as an RF signal.

The analog front end 40 is configured to employ an APC (automatic power control circuit) 41, a register 43 and an RF-signal processing circuit 42 which includes such as an ATT/MUX (attenuator and multiplexer) circuit, an equalizer and a buffer.

A control-signal processing section employed in the analog front end 40 is configured to employ a MUX-S/H (sample/hold)-GCA circuit 50, a wobble GCA circuit 51, a servo GCA circuit 52, an AGC (automatic gain control) circuit 53 and a focus/tracking detection circuit 54.

A demodulation section employed in the digital front end 60 provided to serve as a section for demodulating an RF signal is configured to include an RFADC (RF analog/digital converter) 61 and a digital-signal processing circuit 62 for carrying out processing such as a demodulation process, an error correction process and a decoding process. The error correction process is normally carried out by making use of an ECC (error correction circuit).

In addition, a control section employed in the digital front end 60 is configured to include a wobble ADC 63, a wobble-signal processing circuit having a demodulation/ECC, a servo ADC 68, a servo control circuit 69 and a DAC (digital-analog converter) 70.

On top of that, a modulation section employed in the digital front end 60 is configured to include an MPU (microprocessor unit)/encoder 65, a write strategy circuit 66 for carrying out a laser modulation process and a PC/IF (personal computer/interface) circuit 67.

In addition, the optical-disc recording/reproduction apparatus 10 also employs other components such as the memory 81 and a motor driver (also referred to as a motor drive circuit) 82.

[Operations of the Optical-Disc Recording/Reproduction Apparatus]

On the optical disc 11, there have been created grooves which are wobbled on the basis of the absolute-time information. Various kinds of information are recorded by the optical-disc recording/reproduction apparatus 10 along each of the wobbling grooves. The optical-disc recording/reproduction apparatus 10 reads out the information which has been recorded along each of the wobbling grooves on the optical disc 11. In the recording and reading operations, while adjusting the tracking and the focus, the optical-disc recording/reproduction apparatus 10 rotates the optical disc 11 at a CLV (constant linear velocity) or a CAV (constant angular velocity) by driving the spindle motor 21.

The optical-disc recording/reproduction apparatus 10 is provided with the optical-pickup unit 30 which is facing the optical disc 11. The optical-pickup unit 30 is a component for carrying out the operation to record information onto the optical disc 11 and the operation to reproduce information from the optical disc 11. As described before, the optical-pickup unit 30 includes the laser diode 33 and the PDIC 35. In a period allocated to the operation to record information, the laser diode 33 outputs a laser light beam and radiating the laser light beam to the optical disc 11 by way of the lens 31 in order to record the information onto the optical disc 11. In a reproduction period allocated to the operation to read out information from the optical disc 11, on the other hand, the information already recorded on the optical disc 11 is supplied to the PDIC 35 as a light beam. As explained previously, the PDIC 35 is typically a photo detector employing a photo diode of a 4-division type and an operational amplifier. The photo diode of the 4-division type outputs four signals A, B, C and D respectively to the amplifier which then carries out addition and subtraction operations in order to generate a sum signal (A+B+C+D) as an RF signal to be output along with the four signals A, B, C and D.

Various kinds of information are retrieved from the RF signal. The information retrieved from the RF signal includes a video (or an image)/audio signal and a control signal used for controlling an external apparatus. In addition, the four signals A, B, C and D are used for generating a variety of control signals such as a wobble signal, a focus signal and a tracking signal.

Furthermore, the same operation for generating signals as above is done in a period allocated to the operation to record information.

The RF signal output by the PDIC 35 is supplied to the RF-signal processing circuit 42. A VGA employed in the RF-signal processing circuit 42 as will be described later sustains the level of the RF signal received from the PDIC 35 at a constant level. Then, the equalizer employed in the RF-signal processing circuit 42 emphasizes the frequency of each signal in a high-frequency area. Subsequently, the RF-signal processing circuit 42 outputs an RF signal generated by the equalizer to the RFADC 61 which carries out an analog-digital conversion process to convert the RF signal from an analog signal into a digital one.

The RFADC 61 outputs the digital signal, which has been obtained as a result of the analog-digital conversion process carried out by the RFADC 61 in order to convert the RF signal into the digital signal, to the digital-signal processing circuit 62. The digital-signal processing circuit 62 carries out a demodulation process on the digital RF signal. Then, the digital-signal processing circuit 62 carries out processing such as a decoding process and an error correction process. The decoding process is carried out by a decoder employed in the digital-signal processing circuit 62 whereas the error correction process is carried out by the ECC employed in the digital-signal processing circuit 62. The decoding process is carried out by the decoder for signals which conform to the MPEG-2, MPEG-4H.264/AVC, SMPTEVC-1, linear PCM and MPEG-2AAC methods and the like.

An image and an audio signal, which have been obtained as a result of the decoding process, are stored typically in the memory 81. Later on, the image and the audio signal are read out from the memory 81 and supplied to a display apparatus by way of the PC/IF circuit 67.

The decoder cited above may be employed in a microcomputer. In this case, the digital-signal processing circuit 62 carries out a demodulation process on the digital RF signal. A controller 153 shown in a block diagram of FIG. 2 to be described later then supplies a signal obtained as a result of the demodulation process to the microcomputer by way of an interface. Subsequently, the decoder employed in the microcomputer decodes the signal, which has been received from the interface, in order to generate an image and an audio signal.

Figure 2:
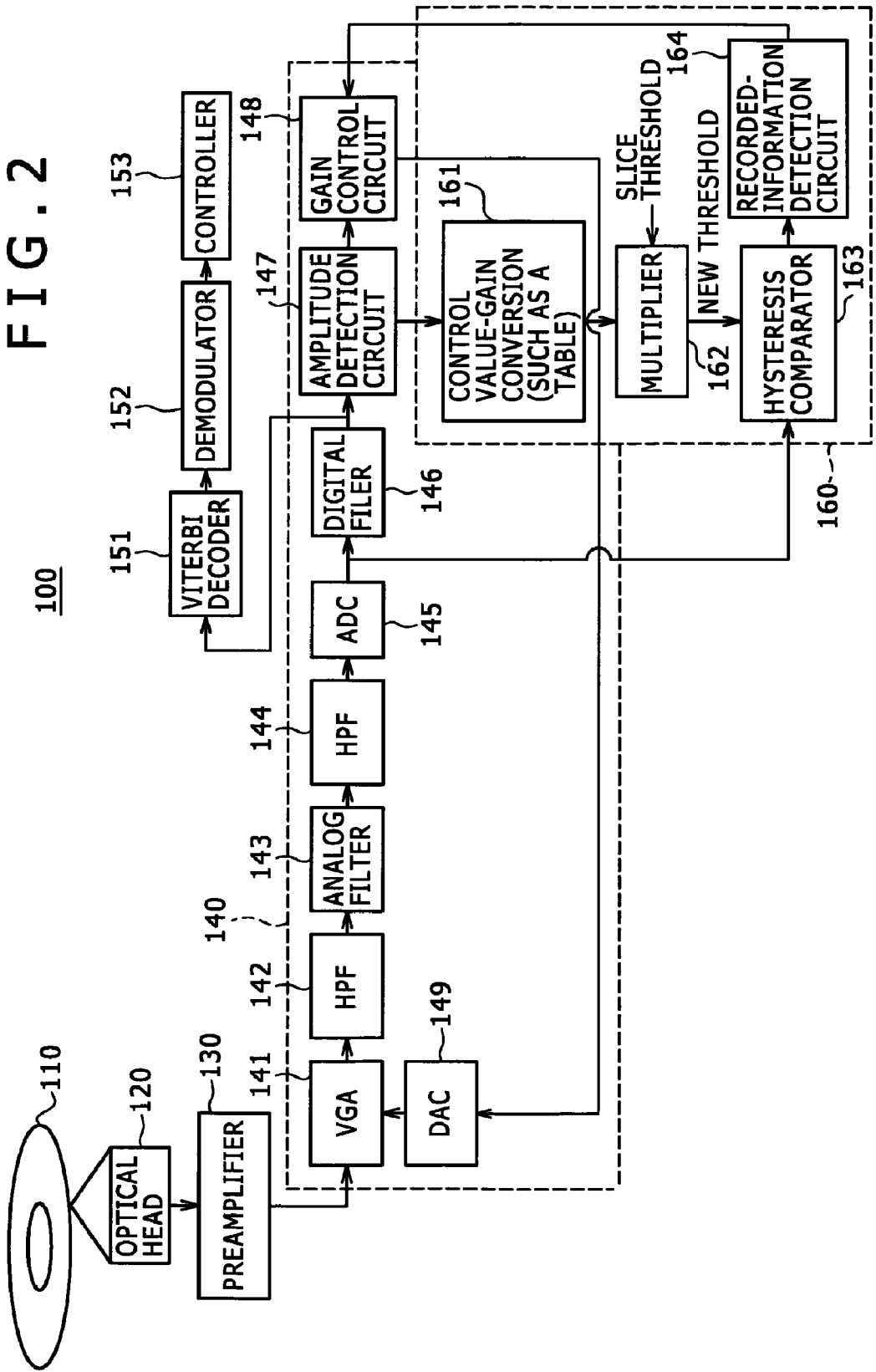
FIG. 2 is a block diagram showing the configuration of an RF-signal processing system employed in the optical-disc recording/reproduction apparatus.

In addition, in accordance with the embodiment of the present invention, the digital-signal processing circuit 62 is provided with an amplitude detection circuit 147 as shown in the block diagram of FIG. 2. The amplitude detection circuit 147 is a circuit for digitally detecting the amplitude of the digital RF signal supplied to the digital-signal processing circuit 62. The detected amplitude is subjected to a control value-to-gain conversion process, using a control value-gain conversion table 161. A multiplier 162 multiplies the coefficient found from the table by a slice threshold supplied to the multiplier 162 in order to generate a new threshold. The new threshold is then supplied to a hysteresis comparator 163 which is also referred to as a comparison section. The hysteresis comparator 163 compares the new threshold with the digital RF signal generated by an ADC 145 and supplies a signal obtained as a result of the comparison to a recorded-information detection circuit 164. The recorded-information detection circuit 164 executes on/off control on the operation of a gain control circuit 148 in order to control an operation to turn on/off an AGC loop.

If an RF signal exists, a control signal generated by the gain control circuit 148 is used for controlling the gain of a VGA (Variable Gain Amplifier) 141 in the so-called normal gain control operation. If an RF signal does not exist, on the other hand, another control signal generated by the recorded-information detection circuit 164 is used to drive the gain control circuit 148 to generate a control signal having the same value as a control signal generated by the gain control circuit 148 right before the RF signal becomes non-existent. That is to say, the other control signal generated by the recorded-information detection circuit 164 drives the gain control circuit 148 to sustain the level of a control signal generated by the gain control circuit 148 at the same value as a control signal generated by the gain control circuit 148 right before the RF signal becomes non-existent. Then, the control signal generated by the gain control circuit 148 is used for controlling the gain of the VGA 141.

The reader is requested to again refer to the block diagram of FIG. 1. A servo signal generated by the MUX-S/H-GCA circuit 50 on the basis of the signals A to D output by the PDIC 35 is used in the servo GCA circuit 52 for controlling the amplitude of a signal output by the servo GCA circuit 52. The output signal is supplied to the focus/tracking detection circuit 54 for generating signals such as a mirror detection signal, a defect detection signal, an OPC (optimum power control) signal, a focus signal and a tracking signal. The generated signals are supplied to the servo ADC 68 for converting each of the signals from an analog signal into a digital one. The digital signals generated by the servo ADC 68 are processed by the servo control circuit 69 which then outputs digital signals obtained as a result of the processing to the DAC 70. The DAC 70 then converts the digital signals into analog ones and supplies the analog signals to the motor driver 82. A control signal output by the motor driver 82 is supplied to the focus and tracking actuator 36 through a flexible cable or the like. In accordance with the control signal received from the motor driver 82, the focus and tracking actuator 36 controls the optical-pickup unit 30, adjusting the focus, the tracking and other control quantities.

In addition, the signals A to D output by the PDIC 35 are supplied also to the MUX-S/H-GCA circuit 50 which also converts each of the signals A to D into a binary signal. The MUX-S/H-GCA circuit 50 then carries out logic processing on the binary signals in order to generate sampling pulses for the purpose of S/H operations. A sampling pulse generated by the MUX-S/H-GCA circuit 50 is used for sampling a raw wobble signal, which has been generated also by the MUX-S/H-GCA circuit 50 on the basis of the signals A to D, and for holding the sampled raw wobble signal with a timing determined in advance in order to generate an accurate wobble signal. Then, the accurate wobble signal is subjected to AGC processing carried out by the wobble GCA circuit 51 and the AGC circuit 53 which outputs an analog wobble signal to the wobble ADC 63. The wobble ADC 63 converts the analog wobble signal into a digital wobble signal.

During an operation to write information onto the optical disc 11, an image and an audio signal are supplied to the PC/IF circuit 67 from the output terminal of a receiver or the output terminal of a PC (Personal Computer) and are stored in the memory 81. Later on, information such as the image and the audio signal is read out from the memory 81 and supplied to the MPU/encoder 65.

The audio signal is converted into a signal which conforms to the linear PCM and/or MPEG-2 methods whereas a video signal representing the image is encoded into a digital signal containing information compressed in accordance with the MPEG-2 method or the like. Then, the encoded video signal is converted into packets before being encrypted. The encrypted digital signal is then subjected to a modulation process carried out by the write strategy circuit 66 in order to generate a modulated signal for modulating the laser diode 33. The modulation process carried out by the write strategy circuit 66 is a modulation process which is based on a multipulse modulation method and compensated for recording. The write strategy circuit 66 supplies the result of the modulation to the LD (laser diode) driver 34. Subsequently, modulated pulses output by the laser diode driver 34 are supplied to the laser diode 33 in order to write information onto the optical disc 11 in accordance with the on and off states of the pulses.

In addition, in a wobble detection process carried out by the optical-disc recording/reproduction apparatus 10 shown in FIG. 1, sampling pulses are generated in the MUX-S/H-GCA circuit 50 by making use of an RF signal supplied by the PDIC 35 to the MUX-S/H-GCA circuit 50. A sampling pulse generated by the MUX-S/H-GCA circuit 50 is used for sampling a raw wobble signal which has been generated also by the MUX-S/H-GCA circuit 50, and for holding the sampled raw wobble signal with a timing determined in advance in order to generate an accurate wobble signal.

<2. Configuration of an RF-Signal Processing System>

Next, a block configuration of an RF-signal processing system according to the embodiment of the present invention is explained. In FIG. 2, blocks excluding some specific blocks correspond to the RF-signal processing circuit 42 and the RFADC 61 which are shown in the block diagram of FIG. 1. The specific blocks are a Viterbi decoder 151, a demodulator 152 and a controller 153 which together form a digital-signal processing block 150.

The digital-signal processing block 150 including the Viterbi decoder 151, the demodulator 152 and the controller 153 is a portion of the digital-signal processing circuit 62 shown in the block diagram of FIG. 1. The output terminal of the controller 153 is connected typically to the interface of a personal computer.

The RF-signal processing system for carrying out RF-signal processing on an analog RF signal is configured to include a VGA (variable-gain amplifier) 141, an HPF (high-pass filter) 142, an analog filter 143 also referred to as an LPF (low-pass filter) and another HPF 144. On the other hand, another part of the RF-signal processing system is a section for carrying out RF-signal processing on a digital RF signal. This other part of the RF-signal processing system is configured to include an ADC 145, a digital filter 146, an amplitude detection circuit 147, a gain control circuit 148, a control value-gain conversion table 161, a multiplier 162, a hysteresis comparator 163 and a recorded-information detection circuit 164.

A recorded-information detection section 160 provided by the present embodiment includes the control value-gain conversion table 161, the multiplier 162, the hysteresis comparator 163 and the recorded-information detection circuit 164. The recorded-information detection section 160 having a digital configuration is also referred to simply as a detection circuit.

The digital-signal processing circuit 62 is configured to also include a decoder for decoding an image and an audio signal in addition to the Viterbi decoder 151, the demodulator 152 and the controller 153.

Since an optical disc 110, an optical head 120 and a preamplifier 130 have been explained earlier, their detailed description is not repeated in the following explanation.

[Connection Configuration of the RF-Signal Processing System]

The optical head 120 is a component for converting a light beam reflected by the optical disc 110 from an optical signal into an electrical one. The output terminal of the optical head 120 is connected to the input terminal of the preamplifier 130.

The output terminal of the preamplifier 130 is connected to the input terminal of the VGA 141 having a gain which can be changed in accordance with a control signal of an analog voltage generated by a DAC (digital/analog converter) 149.

The output terminal of the VGA 141 is connected to the input terminal of the HPF 142 for removing a DC offset and noises each having a low frequency from an RF signal output by the VGA 141 to the HPF 142.

The output terminal of the HPF 142 is connected to the input terminal of the analog filter 143 (also referred to as an LPF) for removing noises each having a high frequency from an RF signal output by the HPF 142 to the analog filter 143.

The output terminal of the analog filter 143 is connected to the input terminal of the HPF 144 for removing an offset from an RF signal output by the analog filter 143 to the HPF 144.

The output terminal of the HPF 144 is connected to the input terminal of the ADC 145 for converting the RF signal from an analog signal into a digital one.

The output terminal of the ADC 145 is connected to the input terminal of the digital filter 146 and the input terminal of the hysteresis comparator 163 which is employed in the recorded-information detection section 160.

In the case of an optical-disc recording/reproduction apparatus 10 connected to a microcomputer not shown in FIG. 1, the RF-signal processing circuit 42 is configured as follows. The output terminal of the digital filter 146 is connected to the input terminal of the amplitude detection circuit 147 and the input terminal of the Viterbi decoder 151 as shown in the block diagram of FIG. 2. The output terminal of the Viterbi decoder 151 is connected to the input terminal of the demodulator 152 whereas the output terminal of the demodulator 152 is connected to the input terminal of the controller 153. The controller 153 records an image and an audio signal into the memory 81. Later on, the controller 153 reads out the image and the audio signal from the memory 81, supplying the image and the audio signal to an external terminal.

In the case of an optical-disc recording/reproduction apparatus 10 used specially for processing images and audio signals, on the other hand, the Viterbi decoder 151, the demodulator 152 and the controller 153 are connected to a decoder which is provided in the digital-signal processing circuit 62.

The output terminal of the digital filter 146 is connected to the input terminal of the amplitude detection circuit 147 which is used for detecting the amplitude of a digital RF signal supplied by the digital filter 146 to the amplitude detection circuit 147. The first output terminal of the amplitude detection circuit 147 is connected to the input terminal of the gain control circuit 148 whereas the second output terminal of the amplitude detection circuit 147 is connected to the input terminal of the control value-gain conversion table 161.

The output terminal of the control value-gain conversion table 161 is connected to the first input terminal of the multiplier 162 of digital configuration. A digitalized slice threshold is supplied to the second input terminal of the multiplier 162.

The output terminal of the multiplier 162 is connected to the first input terminal of the hysteresis comparator 163. The output terminal of the ADC 145 is connected to the second input terminal of the hysteresis comparator 163.

The output terminal of the hysteresis comparator 163 is connected to the input terminal of the recorded-information detection circuit 164 which is used for turning the AGC loop on and off by executing on/off control on the operation of the gain control circuit 148.

The output terminal of the recorded-information detection circuit 164 is connected to the second input terminal of the gain control circuit 148 whereas the output terminal of the gain control circuit 148 is connected to the input terminal of the DAC 149.

The DAC 149 is a component for converting a digital control signal supplied by the gain control circuit 148 into an analog control signal and outputting the analog control signal to the VGA 141 by way of the output terminal of the DAC 149 and a control terminal of the VGA 141.

[Configurations of Blocks in the RF Signal Processing System and Operations of the Blocks]

The following description explains the configurations of blocks composing the RF signal processing system and operations carried out by the blocks.

The gain of the VGA 141 is variably controlled by an analog control signal generated by the DAC 149 as a result of a digital-to-analog conversion process carried out by the DAC 149 on a digital control signal output by the gain control circuit 148 which is provided at the rear stage of the AGC loop. The gain of the VGA 141 is controlled in order to adjust the amplitude of a signal output by the VGA 141 to the D range (dynamic range) of a circuit provided at a stage following the VGA 141.

The HPF 142 prevents an offset voltage generated by the VGA 141 provided at a preceding stage from being injected into the ADC 145 provided at a succeeding stage and also eliminates noises each having a low frequency from an RF signal output by the VGA 141 to the analog filter 143. The analog filter 143 is an LPF. The analog filter 143 eliminates noises each having a high frequency from the RF signal supplied to the analog filter 143. The HPF 144 prevents an offset voltage generated by, among others, the analog filter 143 provided at a preceding stage from being injected into the ADC 145 provided at a succeeding stage. In general, the cutoff frequency of the HPF 144 is set at a value lower than the cutoff frequencies of the HPF 142 and the analog filter 143 which are provided at stages preceding the HPF 144.

In the optical-disc recording/reproduction apparatus employing an RF-signal processing system 100 shown in FIG. 2, the ADC 145 is generally configured to generate a digital signal having a length of 6 bits. Typically, the ADC 145 adopts a flash conversion method which allows the analog-to-digital conversion process to be carried out at a high speed. If the digital filter 146 and the digital-signal processing circuits are made of a CMOS, the ADC 145 is also a semiconductor device made of the same CMOS. The digital filter 146 is typically a FIR-type filter. The digital filter 146 carries out a filtering process on a digital RF signal output by the ADC 145.

The Viterbi decoder 151 carries out an error correction process on a digital RF signal supplied to the Viterbi decoder 151 from the digital filter 146 by making use of a Viterbi code. Since the error correction process making use of a Viterbi code is generally carried out by an ordinary optical-disc apparatus, detailed explanation of the process is omitted from the following description.

The demodulator 152 carries out demodulation processing on data obtained as a result of the error correction process executed by making use of a Viterbi code before the data is decoded in order to generate an image and an audio signal from the data. The demodulation processing includes a 1-7 PP demodulation process and an EFM demodulation process.

The controller 153 outputs addresses, a variety of control signals for a spindle servo system and the like and a control signal used in an operation to store data obtained as a result of the demodulation in an external memory.

Data output by the demodulator 152 (or data output by the controller 153) is supplied to a decoder not shown in FIG. 2 by way of the external memory. The decoder decodes the video signal representing the image in accordance with any method such as the MPEG-2, MPEG-4H.264/AVC, and SMPTEVC-1. On the other hand, the audio signal is decoded in accordance with any method such as the linear PCM, MPEG-2AAC or Dolby digital (AC-3, a trademark) method.

Data output by the controller 153 is supplied to the interface of a microcomputer by way of the external memory and a PC/IF circuit. Then, a decoder embedded in the microcomputer decodes the data in order to generate an image and an audio signal from the data.

[Operations of Main Sections Provided by the Present Invention]

Operations carried out by main sections provided by the present invention are carried out as follows.

The amplitude detection circuit 147 employed in the RF-signal processing system 100 shown in FIG. 2 detects the amplitude of a digital RF signal received from the digital filter 146 and supplies the detected amplitude to the gain control circuit 148 as well as the control value-gain conversion table 161.

On the basis of the detected amplitude received from the amplitude detection circuit 147, the gain control circuit 148 generates a control signal which is supplied to the VGA 141 and used for controlling the gain of the VGA 141. In addition, a control signal is supplied from the recorded-information detection circuit 164 to the gain control circuit 148 to be used for executing on/off control on the operation of the gain control circuit 148 in order to generate the control signal. As a result of the on/off control, the operation of the AGC loop is also turned on and off. With the operation of the gain control circuit 148 put in a turned-on state, the gain control circuit 148 provides the VGA 141 with a control signal according to the amplitude detected by the amplitude detection circuit 147. With the operation of the gain control circuit 148 put in a turned-off state, on the other hand, the gain control circuit 148 provides the VGA 141 with a control signal having a control voltage equal to the control voltage of a control signal which was generated by the gain control circuit 148 right before the operation of the gain control circuit 148 was put in the turned-off state. The gain control circuit 148 is sustaining the control signal generated thereby at the control voltage of a control signal till the operation of the gain control circuit 148 is put in a turned-on state. The period during which the gain control circuit 148 is sustaining the control signal as above is referred to as a hold period.

The control value-gain conversion table 161 is a table used for storing VGA control gains and coefficients each serving as a multiplicand to be multiplied by a slice threshold. The control value-gain conversion table 161 is typically a memory used for storing the binary values of the VGA control gains and the coefficients. An amplitude detected by the amplitude detection circuit 147 is converted into a VGA control gain which is then used for finding a coefficient from the control value-gain conversion table 161. Then, the coefficient is supplied to the first input terminal of the multiplier 162.

The multiplier 162 is a digital multiplier for multiplying the coefficient output by the control value-gain conversion table 161 to the first input terminal of the multiplier 162 by a slice threshold supplied to the second input terminal of the multiplier 162. The multiplier 162 outputs the product resulting from the multiplying operation to the hysteresis comparator 163 as a new threshold which represents a slice level. Thus, the new threshold is a product obtained as a result of the operation to multiply the slice threshold by the coefficient which represents a VGA control gain.

The hysteresis comparator 163 is a digital circuit which serves as a comparator for comparing a digital RF signal received from the ADC 145 with the threshold received from the multiplier 162. The hysteresis comparator 163 has an input/output characteristic represented by hysteresis curves. The hysteresis comparator 163 converts the digital RF signal into a value represented by a point on the hysteresis curves and compares the value with the threshold.

To put it in detail, the hysteresis comparator 163 receives the digital RF signal from the ADC 145 and the threshold from the multiplier 162, converts the digital RF signal into a value represented by a point on the hysteresis curves and compares the value with the threshold. The result of the comparison is a binary signal (pulse) which can be set at an H or L level representing the result. The hysteresis comparator 163 outputs the result of the comparison to the recorded-information detection circuit 164.

The recorded-information detection circuit 164 receives the binary signal from the hysteresis comparator 163 as a signal representing the result of the comparison. That is to say, the recorded-information detection circuit 164 receives a pulse or no pulse from the hysteresis comparator 163. In accordance with the number of pulses received from the hysteresis comparator 163, the recorded-information detection circuit 164 outputs a control signal serving as a recorded-information detection signal to the gain control circuit 148. The recorded-information detection circuit 164 will be described more later.

Figure 3:
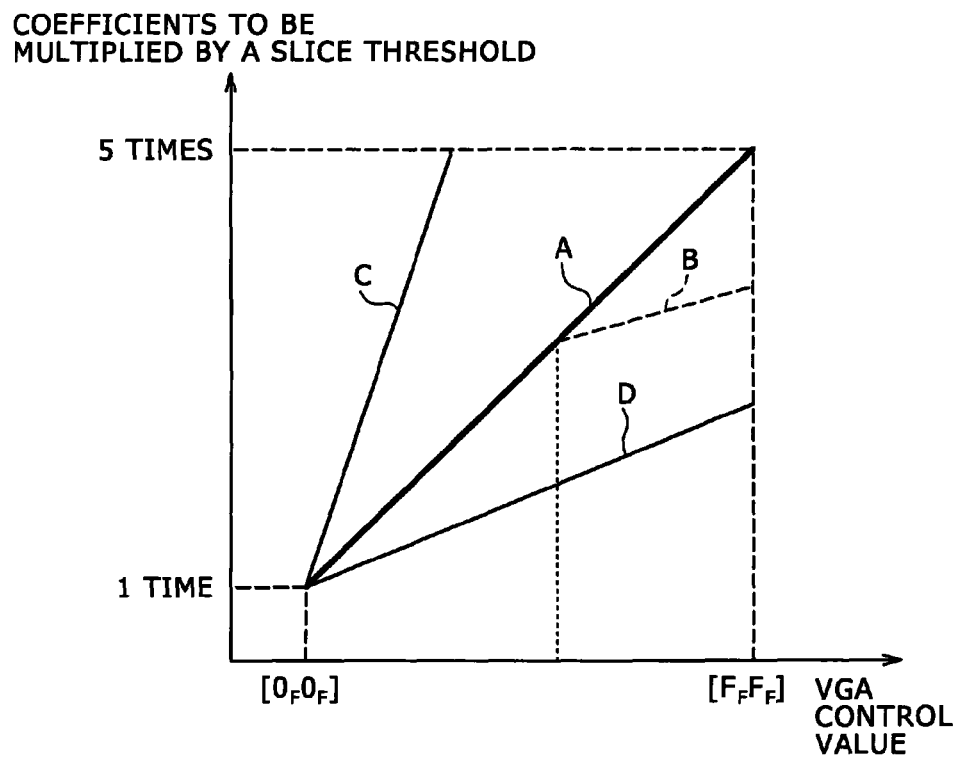
FIG. 3 is a diagram showing graphs each representing a relation between VGA control gains and coefficients to be multiplied by a slice threshold.

FIG. 3 is a diagram showing graphs each representing a relation between the VGA control gain and the coefficient to be used as a multiplicand to be multiplied by a slice threshold. In FIG. 3, the VGA control value is represented by the horizontal axis whereas the coefficient to be multiplied by a slice threshold is represented by the vertical axis. In the figure, the coefficient has values in the range 1 (time) to 5 (times) whereas the VGA control value has values in the range $0_F 0_F$ to $F_F F_F$. It is to be noted that the values of the coefficient are by no means limited to those shown along the vertical axis in the diagram of FIG. 3. That is to say, the values of the coefficient can be set in accordance with the range of the thresholds to be newly generated and the slice threshold.

In FIG. 3, the straight lines A, C and D all pass through a point which represents a coefficient of 1 and a VGA control value of 1. The straight line A has a gradient of 1. In the case of the straight line A, for a VGA control value set at 1, a coefficient of 1 is found and, for a VGA control value set at 5, a coefficient of 5 is found.

The straight line A can be combined with the straight line B in order to represent a non-linear relation between the VGA control value and the coefficient. In the case of this non-linear relation, for a VGA control value set at 1, a coefficient of 1 is found and, for a VGA control value set at 3, a coefficient of 3 is found. For a VGA control value set at 5, however, a coefficient of 3.5 is found.

The straight line C has a gradient which is greater than 1. In the case of the straight line C, for a VGA control value set at 1, a coefficient of 1 is found and, for a VGA control value set at 2.5, a coefficient of 5 is found.

The straight line d has a gradient of ½. In the case of the straight line d, for a VGA control value set at 1, a coefficient of 1 is found and, for a VGA control value set at 5, a coefficient of 2.5 is found.

In place of such lines which can be a straight line, a polygonal line, a first-order (linear) curve, - - -, an nth-order curve, distribution curve or a combination of them, the control value-gain conversion table 161 is actually used for storing the values of the VGA control gain and the coefficient.

In the case of the typical relations shown in the diagram of FIG. 3, the lower and upper limits of the coefficient are set at 1 and 5 respectively. In addition, at least one of the lower and upper limits can also be set at a value determined in advance.

As described before, the coefficient found from a relation between VGA control gains and coefficients is used for computing a new threshold which is then compared by the hysteresis comparator 163 with a digital RF signal. Since the coefficient varies in accordance with the VGA control gain, the threshold compared by the hysteresis comparator 163 with a digital RF signal can also be changed arbitrarily in accordance with the operating state of the AGC loop. Thus, the degree of the design freedom can be increased.

The following description explains the configuration of the recorded-information detection circuit 164 and operations carried out by the recorded-information detection circuit 164.

Figure 4:
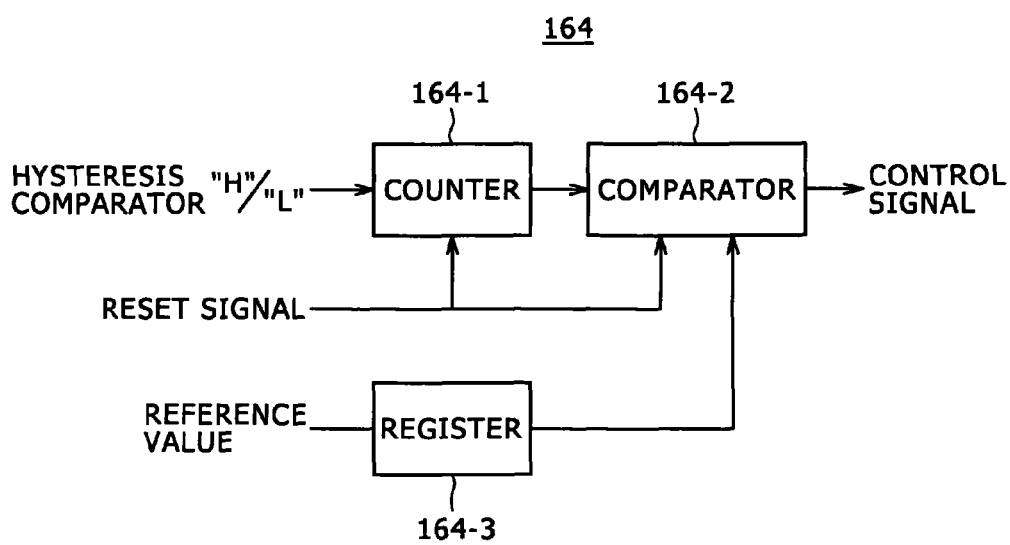
FIG. 4 is a block diagram showing a typical configuration of a recorded-information detection circuit.

FIG. 4 is a block diagram showing a typical configuration of the recorded-information detection circuit 164. As shown in the figure, the recorded-information detection circuit 164 is configured to employ a counter 164-1, a comparator 164-2 and a register 164-3. The counter 164-1 receives a pulse set at an H or L level from the hysteresis comparator 163 provided at a stage preceding the recorded-information detection circuit 164. The counter 164-1 counts the number of, for example, H pulses received during a period determined in advance. When the counter 164-1 receives a reset signal, the counter 164-1 outputs a pulse count representing the number of pulses to the comparator 164-2 and resets the pulse count. Then, the counter 164-1 starts the next operation to count the number of pulses. The register 164-3 is used to hold an arbitrary value of reference value corresponding to an interval between two successive reset signals and to output the reference value to the comparator 164-2. The comparator 164-2 compares the pulse count received from the counter 164-1 with the reference value stored in the register 164-3 and outputs a comparison result to the gain control circuit 148.

Figure 5A:
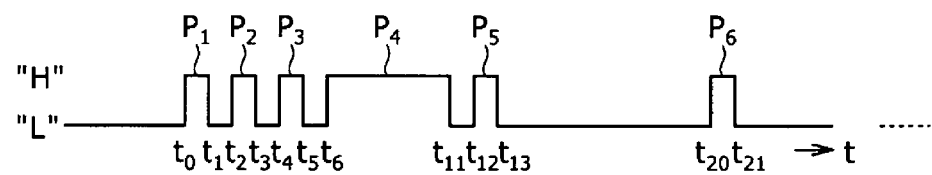
FIGS. 5A and 5B are explanatory diagrams each showing the waveform of a signal used in operations carried out by the recorded-information detection circuit.
Figure 5B:
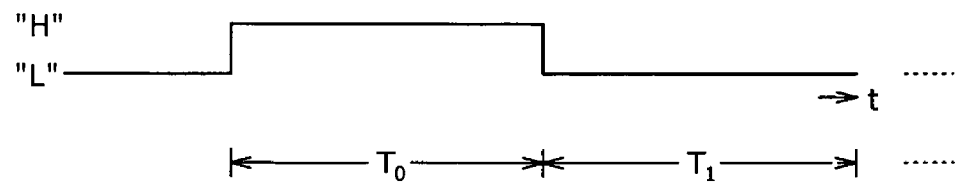

FIGS. 5A and 5B are explanatory diagrams each showing the waveform of a signal used in operations carried out by the recorded-information detection circuit 164. As shown in FIG. 5A, the binary pulses $P_1$, $P_2$, - - - and P6 are received by the counter 164-1 from the hysteresis comparator 163 during predetermined periods $T_0$, $T_1$ and so on after the recorded-information detection circuit 164 is reset. The counter 164-1 counts the number of pulses $P_1$, $P_2$ - - - and $P_5$ set at an H level during the period $T_0$ in FIG. 5B whereas the comparator 164-2 compares the pulse count received from the counter 164-1 with the reference value stored in the register 164-3. If the pulse count is equal to or greater than the reference value, the comparator 164-2 outputs a pulse set at typically an H level as a control signal. On the other hand, during the period $T_1$, the counter 164-1 counts a pulse $P_6$ received from the hysteresis comparator 163 and supply the pulse count to the comparator 164-2. The comparator 164-2 compares the pulse count with the reference value. If the pulse count is smaller than the reference value, on the other hand, the comparator 164-2 outputs, during the period $T_1$, a pulse set at typically an L level as a control signal as shown in FIG. 5B. It is to be noted that, in actuality, the comparator 164-2 outputs a pulse shown as a pulse set at an H or L level in FIG. 5B after the operation to count the number of input pulses shown in FIG. 5A has been completed. In order to make the description easy to understand, however, the waveform of a pulse overlaps a period during which the operation to count the number of input pulses is being carried out. That is to say, in FIGS. 5A and 5B, the waveform of a pulse does not lag behind the period during which the operation to count the number of input pulses is being carried out.

<3. Operations of an RF-Signal Processing Circuit>

The following description explains all operations which are carried out by the RF-signal processing system 100 for a case in which data has been recorded on the optical disc 110.

A laser light beam radiated to the optical disc 110 is reflected by the optical disc 110 and supplied to the optical head 120. The optical head 120 converts the laser light beam from an optical signal into an electrical one. Electrical signals generated by photo detectors employed in the optical head 120 are added to each other in order to generate an RF signal which is then amplified by the preamplifier 130. The amplified RF signal output by the preamplifier 130 is supplied to the VGA 141. The gain of the VGA 141 is controlled by a control signal generated by the DAC 149. The gain of the VGA 141 is controlled in order to adjust the amplitude of a signal output by the VGA 141 to the D range (dynamic range) of a circuit provided at a stage following the VGA 141.

An RF signal with its amplitude adjusted is supplied from the VGA 141 to the HPF 142 which removes a DC offset and noises each having a low frequency from the RF signal output by the VGA 141 to the HPF 142. The RF signal output by the HPF 142 is supplied to the analog filter 143 which removes unnecessary high-frequency components from the RF signal output by the HPF 142 to the analog filter 143. The RF signal output by the analog filter 143 is supplied to the HPF 144 which removes an offset from the RF signal output by the analog filter 143 to the HPF 144. The RF signal output by the HPF 144 is supplied to the ADC 145 which converts the RF signal from an analog signal into a digital one. The ADC 145 is generally configured to generate a digital signal having a length of 6 bits. The ADC 145 supplies the digital RF signal to the digital filter 146.

The digital filter 146 carries out a filtering process on the digital RF signal output by the ADC 145. The digital RF signal completing the filtering process carried out by the digital filter 146 is supplied to the Viterbi decoder 151 which carries out a Viterbi decoding process and an error correction process on the digital RF signal.

The digital RF signal completing the above processes is supplied by the Viterbi decoder 151 to the demodulator 152. The demodulator 152 carries out demodulation processing on the digital RF signal received from the Viterbi decoder 151. The demodulation processing includes a 1-7 PP demodulation process, an EFM demodulation process and/or an 8-16 conversion process. The RF signal obtained as a result of the demodulation processing is supplied by the demodulator 152 to a decoder employed in the digital-signal processing circuit 62 and/or an interface by way of the controller 153.

The decoder decodes the video signal of the RF signal in accordance with any method such as the MPEG-2 or MPEG-4 method. On the other hand, the audio signal of the RF signal is decoded in accordance with any method such as the linear PCM, MPEG-2AAC or Dolby digital (AC-3) method.

[Operations of the AGC Loop]

Operations carried out by the AGC loop are explained as follows.

The digital RF signal obtained as a result of a digitalization process carried out by the ADC 145 is supplied to the digital filter 146 which then carries out a filtering process on the digital RF signal and supplies the thus obtained digital RF signal to the amplitude detection circuit 147.

The amplitude detection circuit 147 digitally detects the amplitude of the digital RF signal received from the digital filter 146 and then supplies the detected amplitude of the digital RF signal to the gain control circuit 148 as well as the control value-gain conversion table 161.

The detected amplitude of the digital RF signals supplied to the control value-gain conversion table 161 is subjected to a conversion process to obtain a VGA control gain. Then, a coefficient for the thus obtained VGA control gain is found from the control value-gain conversion table 161. For example, the VGA control gain for the detected amplitude of the digital RF signal is 1 and the coefficient for the VGA control gain is also 1. The multiplier 162 then multiplies the coefficient found from the table by a slice threshold supplied to the multiplier 162 in order to generate a new threshold which is then supplied to the hysteresis comparator 163.

The coefficient of 1 is used because the digital RF signal in this case is assumed to be a signal which does not necessitate the multiplier 162 to change the slice threshold to a new threshold to be supplied to the hysteresis comparator 163. If the amplitude of the digital RF signal supplied by the ADC 145 to the hysteresis comparator 163 is small, a new threshold smaller than the slice threshold needs to be generated in the multiplier 162 by multiplying the slice threshold by a coefficient smaller than 1 so that the hysteresis comparator 163 is capable of correctly determining whether the amplitude of the digital RF signal is greater or smaller than the new threshold.

The coefficient (gain) retrieved from the control value-gain conversion table 161 as a coefficient having the value of 1 is supplied to the multiplier 162 which then multiplies the coefficient by the slice threshold supplied to the multiplier 162 in order to generate the new threshold.

The new threshold is then supplied to the hysteresis comparator 163 which then compares the new threshold with the digital RF signal generated by the ADC 145 and supplies a signal obtained as a result of the comparison to the recorded-information detection circuit 164. The result of the comparison is a signal set at either an L (low) level or an H (level). That is to say, the hysteresis comparator 163 supplies a pulse or no pulse to the recorded-information detection circuit 164 as a result of the comparison. For example, if the digital RF signal generated by the ADC 145 is greater than the threshold, the hysteresis comparator 163 supplies a pulse (or a comparison-result signal set at the H level) to the recorded-information detection circuit 164 as a result of the comparison. If the digital RF signal generated by the ADC 145 is smaller than the threshold, on the other hand, the hysteresis comparator 163 supplies no pulse (or a comparison-result signal set at the L level) to the recorded-information detection circuit 164 as a result of the comparison.

The recorded-information detection circuit 164 counts the number of pulses received during a period determined in advance. In FIG. 5B, the periods determined in advance are the periods $T_0$ and $T_1$. The recorded-information detection circuit 164 compares the pulse count with a reference value stored therein in advance and outputs a comparison result to the gain control circuit 148.

If the pulse count is equal to or greater than the reference value, the recorded-information detection circuit 164 outputs a control pulse set at typically an H level as shown during the period $T_0$ in FIG. 5B. The control pulse set at the H level puts the gain control circuit 148 in a turned-on state. In the turned-on state, the gain control circuit 148 supplies a digital control signal according to the amplitude of the digital RF signal to the DAC 149 from time to time. The DAC 149 converts the digital control signal into an analog control signal and supplies the analog control signal to the control terminal of the VGA 141 in order to control the gain of the VGA 141.

In this way, in the turned-on state of the gain control circuit 148, the AGC loop is turned on and the gain of the VGA 141 is changed in accordance with the amplitude of the digital RF signal.

If the pulse count is smaller than the reference value, on the other hand, the recorded-information detection circuit 164 outputs a control pulse set at typically an L level as shown during the period $T_1$ in FIG. 5B. The control pulse set at the L level puts the gain control circuit 148 in a turned-off state. In the turned-off state, the gain control circuit 148 supplies a digital control signal set at the value of the digital control signal, which was generated right before the turned-off state of the gain control circuit 148, to the DAC 149 from time to time. The DAC 149 converts the digital control signal into an analog control signal and supplies the analog control signal to the control terminal of the VGA 141 in order to control the gain of the VGA 141.

In this way, in the turned-off state of the gain control circuit 148, the AGC loop is turned off and the gain of the VGA 141 is sustained (or held) at a constant value.

The following description explains an operation which is carried out by the AGC loop when a coefficient is set at 5.

With a coefficient of 5 output from the control value-gain conversion table 161, the multiplier 162 multiplies the slice threshold by 5 in order to generate a new threshold and supplies the new threshold to the hysteresis comparator 163. Since the operation carried out thereafter is the same as the operation carried out for a coefficient of 1 described above, the explanation of the operation is omitted from the following description.

It is to be noted that the larger coefficient is output from the control value-gain conversion table 161 because the detected amplitude of the digital RF signal supplied to the hysteresis comparator 163 is large. It is thus necessary to increase the threshold to be compared with the digital RF signal to a value corresponding to the amplitude of the digital RF signal. By increasing the threshold to be compared with the digital RF signal to a value corresponding to the amplitude of the digital RF signal, it is possible to correctly determine whether or not the digital RF signal exists. If the slice threshold is not increased to a larger new threshold and sustained at a small value as it is, in a worst case, the hysteresis comparator 163 mistakenly outputs an H-level comparison result which indicates that even a small amplitude of the digital RF signal is greater than the slice threshold sustained at a small value. In addition, even a noise with a small amplitude larger than the small slice threshold is detected as an existing digital RF signal by the hysteresis comparator 163 which then mistakenly outputs an H-level comparison result causing an incorrect operation.

Typically, the level of an RF signal supplied to the VGA 141 is low because the strength of a light beam reflected by the optical disc 110 is small due to dirt existing on the surface of the optical disc 110.

In addition, no RF signal is supplied to the VGA 141 typically because no signal has been recorded in a recording area of the optical disc 110 in a state referred to as an unrecorded state, because dusts, flaws or the like exist on the surface of the optical disc 110 and/or because the optical pickup is moving over an area between tracks on the surface of the optical disc 110.

As described above, in order to correctly determine whether or not a signal has been recorded in a recording area of the optical disc 110 without regard to whether the amplitude of the RF signal is large or small, a coefficient according to the amplitude of the RF signal is found from the control value-gain conversion table 161 and used as a multiplicand to be multiplied by the slice threshold in order to generate a new threshold which is then compared with the amplitude of the RF signal. Subsequently, a recorded-information detection pulse is generated in accordance with the result of the comparison. Finally, a control signal is found from the recorded-information detection pulse and used for controlling the operation of the gain control circuit 148. As a result, it is possible to turn the AGC loop on and off in accordance with whether or not information has been recorded in a recording area of the optical disc 110 and without regard to whether the amplitude of the RF signal is large or small.

Thus, in accordance with the present invention, the operation to determine whether or not an RF signal exists can be implemented by carrying out digital-signal processing equivalent to the existing recorded-information detection processing carried out by detecting an RF signal supplied to the input side of a VGA. Since the circuit for determining whether or not an RF signal exists in accordance with the present invention is a digital circuit, the size of the circuit can be made small and the power consumption of the circuit can also be decreased as well. In addition, the manufacturing processes can be changed with ease to accompany the miniaturization of future semiconductor devices.

On top of that, in the configuration according to the present invention, signals existing at both stages preceding and succeeding the gain adjustment process can be processed by making use of the same circuit. Thus, the circuit can also be made compact as well.

Furthermore, the coefficient to be multiplied by a slice threshold in order to generate a new threshold to be used in a comparison process for determining the gain of a VGA does not have to be set at a fixed value of 1. That is to say, the coefficient can be changed to a value other than the fixed value of 1. As one of other alternatives, a range can be set for the values of the coefficient. Thus, the degree of freedom to process signals can also be raised as well.

According to the embodiment of the present invention, in the RF-signal processing system 100 shown in FIG. 2, the VGA 141 is a variable-gain amplifier circuit for changing the amplitude of an input signal received from an optical pickup by adjusting the variable gain of an amplifier employed in the circuit in accordance with an analog control signal supplied to the variable-gain amplifier circuit. The ADC 145 is an analog/digital converter provided to serve as a section for converting an analog signal output by the variable-gain amplifier circuit into a digital signal. The amplitude detection circuit 147 is an amplitude detection circuit provided to serve as a section for detecting the amplitude of the digital signal output by the analog/digital converter. The gain control circuit 148 is a gain control circuit provided to serve as a section for generating a control signal for controlling the variable gain in accordance with the amplitude output by the amplitude detection circuit. The DAC 149 is a digital/analog converter provided to serve as a section for converting the digital control signal output by the gain control circuit into the analog control signal supplied to the variable-gain amplifier circuit.

The control value-gain conversion table 161 and the multiplier 162 are a threshold generation circuit provided to serve as a section for generating a threshold on the basis of an amplitude detected by the amplitude detection circuit and a slice threshold. The hysteresis comparator 163 is a comparator provided by the present invention to serve as a section for comparing the digital signal generated by the analog/digital converter with the threshold generated by the threshold generation circuit. The recorded-information detection circuit 164 is a recorded-information detection circuit provided by the present invention to serve as a section for generating a control signal, which is used for carrying out on/off control on the operation of the gain control circuit, on the basis of a comparison result output by the comparator.

The present application contains subject matter related to that disclosed in Japanese Priority Patent Application JP 2008-323370 filed in the Japan Patent Office on Dec. 19, 2008, the entire content of which is hereby incorporated by reference.

In addition, it should be understood by those skilled in the art that a variety of modifications, combinations, sub-combinations and alterations may occur, depending on design requirements and other factors as far as they are within the scope of the appended claims or the equivalents thereof.

What is claimed is:

1. A comparator comprising:
a variable-gain amplifier circuit configured to vary an amplitude of an input signal by changing a gain in accordance with a control signal; and
a comparison section configured to compare a slice level interlocked with a signal level received from the variable-gain amplifier circuit with an output signal received from the variable-gain amplifier circuit and generate an output signal in accordance with a comparison result,
wherein the slice level is a product obtained as a result of multiplying a slice threshold by a coefficient selected from coefficients, which have been included in a conversion table corresponding to amplitudes each detected by an amplitude detection circuit as the amplitude of the output signal generated by the variable-gain amplifier circuit.

2. The comparator according to claim 1, wherein the selected coefficient is a value to be multiplied by a predetermined factor, which found from the conversion table by carrying out a nonlinear conversion process on the amplitude obtained as a detection result.

3. The comparator according to claim 1, wherein the comparison section has a characteristic represented by a hysteresis curve, and compares the slice level with a value indicated by a point on the hysteresis curve as a value of the output signal received from the variable-gain amplifier circuit.

4. The comparator according to claim 1, wherein the input signal is a signal which has been recorded on a recording medium.

5. The comparator according to claim 4, wherein, by detecting the input signal by making use of the comparison section, it is possible to determine whether or not a signal has been recorded on the recording medium.

6. The comparator according to claim 1, wherein the comparison section is a digital circuit.

7. An optical-disc recording/reproduction apparatus for reading out information from an optical disc or writing information onto the optical disc, the optical-disc recording/reproduction apparatus comprising:
a variable-gain amplifier circuit configured to vary an amplitude of an input signal supplied from an optical pickup by changing a gain in accordance with a control signal; and
a comparison section configured to compare a slice level interlocked with a signal level received from the variable-gain amplifier circuit with an output signal received from the variable-gain amplifier circuit and generate an output signal in accordance with a comparison result,
wherein the slice level is a product obtained as a result of multiplying a slice threshold by a coefficient selected from coefficients, which have been included in a conversion table corresponding to amplitudes each detected by an amplitude detection circuit as the amplitude of the output signal generated by the variable-gain amplifier circuit.

8. The optical-disc recording/reproduction apparatus according to claim 7, wherein the selected coefficient is a value to be multiplied by a predetermined factor, which found from the conversion table by carrying out a nonlinear conversion process on the amplitude obtained as a detection result.

9. The optical-disc recording/reproduction apparatus according to claim 7, wherein the comparison section has a characteristic represented by a hysteresis curve, and compares the slice level with a value indicated by a point on the hysteresis curve as a value of the output signal received from the variable-gain amplifier circuit.

10. The optical-disc recording/reproduction apparatus according to claim 7 wherein, by detecting the input signal by making use of the comparison section, it is possible to determine whether or not a signal has been recorded on the recording medium.

11. The optical-disc recording/reproduction apparatus according to claim 7 wherein the comparison section is a digital circuit.

12. An optical-disc recording/reproduction apparatus for reading out information from an optical disc or writing information onto the optical disc, the optical-disc recording/reproduction apparatus comprising:
a variable-gain amplifier circuit configured to vary an amplitude of an input signal supplied from an optical pickup by changing a gain in accordance with a control signal;
an analog/digital converter configured to convert an output signal generated by the variable-gain amplifier circuit into a digital signal;
an amplitude detection circuit configured to detect the amplitude of the digital signal;
a gain control circuit configured to generate the control signal, which is used for controlling a variable gain of the variable-gain amplifier circuit, in accordance with the amplitude obtained as a detection result output by the amplitude detection circuit;
a threshold generation circuit configured to generate a threshold on the basis of the detection result output by the amplitude detection circuit,
wherein the threshold generation circuit includes a conversion table which provides a coefficient for multiplying the detection result received from the amplitude detection circuit by a predetermined factor, and includes a multiplier for multiplying a coefficient selected from the coefficients included in the conversion table by a slice threshold in order to generate a slice level and supplying the slice level to the comparison section;
a comparison section configured to compare the digital signal generated by the analog/digital converter with the threshold; and
a recorded-information detection circuit configured to generate the control signal for executing on/off control on the operation of the gain control circuit in accordance with a comparison result generated by the comparison section.

13. The optical-disc recording/reproduction apparatus according to claim 12, wherein the conversion table outputs a coefficient obtained by carrying out a nonlinear conversion process on the amplitude obtained as a detection result output by the amplitude detection circuit.

* * * * *